(12) United States Patent
Herzig

(10) Patent No.: US 11,040,615 B2
(45) Date of Patent: Jun. 22, 2021

(54) TANK FLAP OR CHARGING FLAP ARRANGEMENT FOR A VEHICLE

(71) Applicant: ILLINOIS TOOL WORKS INC., Glenview, IL (US)

(72) Inventor: Jürgen Herzig, Buchbrunn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 63 days.

(21) Appl. No.: 16/345,759

(22) PCT Filed: Oct. 25, 2017

(86) PCT No.: PCT/US2017/058188
§ 371 (c)(1),
(2) Date: Apr. 29, 2019

(87) PCT Pub. No.: WO2018/081201
PCT Pub. Date: May 3, 2018

(65) Prior Publication Data
US 2020/0055389 A1 Feb. 20, 2020

(30) Foreign Application Priority Data
Oct. 31, 2016 (DE) ...................... 10 2016 120 760.8

(51) Int. Cl.
*B60K 15/05* (2006.01)
*E05D 3/12* (2006.01)

(52) U.S. Cl.
CPC .............. *B60K 15/05* (2013.01); *E05D 3/125* (2013.01); *B60K 2015/053* (2013.01); *B60K 2015/0553* (2013.01)

(58) Field of Classification Search
CPC ............ B60K 15/05; B60K 2015/0507; B60K 2015/0515; B60K 2015/053; B60K 2015/0553; E05D 3/125
(Continued)

(56) References Cited

U.S. PATENT DOCUMENTS 4,782,978 A * 11/1988 Appleby ................ B60K 15/05
220/DIG. 33
4,971,382 A * 11/1990 Ohno ..................... B60K 15/05
16/291
(Continued)

FOREIGN PATENT DOCUMENTS

CN 101532355 A 9/2009
CN 102278025 A 12/2011
(Continued)

OTHER PUBLICATIONS

PCT, International Search Report and Written Opinion, International Application No. PCT/US2017/058188; dated Feb. 27, 2018, 10 pages.

*Primary Examiner* — Dennis H Pedder
(74) *Attorney, Agent, or Firm* — Thompson Hine LLP

(57) ABSTRACT

A tank flap or charging flap arrangement for a vehicle, including a housing which can be inserted into a mounting opening in the vehicle and has at least one connection part for the refueling or electrical charging of the vehicle, furthermore including a flap arranged on a hinge arm of the tank flap or charging flap arrangement, the hinge arm mounted on the housing so as to be pivotable about a first pivot axis, wherein the flap is mounted on the hinge arm so as to be pivotable about a second pivot axis, and therefore the flap can be pivoted between a closed position, in which the flap closes the housing, and a first opening position, in which the flap opens up access to the at least one connection part for refueling or electrical charging, and a second opening position, which is opened further than the first opening position.

19 Claims, 8 Drawing Sheets

(58) Field of Classification Search
USPC ...................................................... 296/97.22
See application file for complete search history.

(56) References Cited

U.S. PATENT DOCUMENTS

| | | | |
|---|---|---|---|
| 9,688,137 B2 * | 6/2017 | Takahashi | ................. E05F 1/10 |
| 2008/0135552 A1 | 6/2008 | Baudoux | |
| 2011/0140477 A1 | 6/2011 | Mihai | |
| 2011/0285166 A1 * | 11/2011 | Baba | ....................... E05D 3/145 |
| | | | 296/97.22 |
| 2019/0118644 A1 | 4/2019 | Beck | |

FOREIGN PATENT DOCUMENTS

| | | |
|---|---|---|
| CN | 204370950 U | 6/2015 |
| CN | 109070736 A | 12/2018 |
| EP | 2392755 A2 | 12/2011 |
| EP | 2364258 B1 | 6/2013 |
| FR | 2816978 B1 | 5/2002 |

* cited by examiner

TANK FLAP OR CHARGING FLAP ARRANGEMENT FOR A VEHICLE

TECHNICAL FIELD

The invention relates to a tank flap or charging flap arrangement for a vehicle, comprising a housing which can be inserted into a mounting opening in the vehicle and has at least one connection part for the refueling or electrical charging of the vehicle, furthermore comprising a flap which is arranged on a hinge arm of the tank flap or charging flap arrangement, the hinge arm being mounted on the housing so as to be pivotable about a first pivot axis.

BACKGROUND

Tank flap or charging flap arrangements serve for the refueling of a vehicle with an operating fluid, such as fuel or a urea solution (AdBlue) or for the electrical charging of the batteries of electrically operated vehicles. An actuating device for a tank flap is known, for example, from EP 2 364 258 B1.

Conventional flap arrangements generally open about an opening angle of 90°. If they are charging flap arrangements for the electrical charging of the vehicle, the flaps often remain open for many hours for the electrical charging operation and can constitute an undesirable obstacle. The housings of such flap arrangements often have to receive two connection parts, for example in order, in the case of diesel vehicles, in addition to a filler neck for entry of diesel fuel, to provide a second filler neck for the entry of urea solution (AdBlue). As a result, the housing, and therefore the flap, has a considerable extent in the lateral direction (longitudinal direction of the vehicle, also x direction). This in turn impairs the ergonomics of known tank flap or charging flap arrangements. This extent is increased further if an actuating device, as known from EP 2 364 258 B1, is arranged in the region of the free end of the pivotably mounted flap.

Starting from the explained prior art, the invention is based on the object of providing a tank flap or charging flap arrangement of the type mentioned at the beginning, the ergonomics of which are improved and which constitutes a smaller obstacle even during a longer open state.

SUMMARY

The invention achieves the object by the subject matter of claim 1. Advantageous refinements are found in the dependent claims, the description and the figures.

For a tank flap or charging flap arrangement of the type mentioned at the beginning, the invention achieves the object in that the flap is mounted on the hinge arm so as to be pivotable about a second pivot axis, and therefore the flap can be pivoted between a closed position, in which the flap closes the housing, and a first opening position, in which the flap opens up access to the at least one connection part for the refueling or electrical charging of the vehicle, and a second opening position, which is opened further than the first opening position.

It is in particular possible that the flap can be pivoted with the hinge arm about the first pivot axis between the closed position and the first opening position, and that the flap can be pivoted about the second pivot axis between the first opening position and the second opening position.

The vehicle to be equipped with the tank flap or charging flap arrangement can be in particular a car. The housing of the tank flap or charging flap arrangement, which housing can be composed of a plastic, for example a two-component plastic, is inserted into a mounting opening in the vehicle, in particular a body cutout. The at least one connection part is connected to associated components of the vehicle, for example refueling pipes or electrical connections.

A hinge arm which bears a flap is mounted pivotably on the housing of the tank flap or charging flap arrangement. The hinge arm can be pivoted out of the housing from a closed position, in which the flap ends, for example, flush with the outer skin of the surrounding vehicle body. The hinge arm can have a curved shape in a manner known per se, and therefore it is pivoted out of the housing over the course of opening of the flap.

The connection parts can be connected, for example, to filler necks for an operating fluid of the vehicle, such as fuel or a urea solution (AdBlue). However, the connection parts can also be connected to electrical connections for connection to an electric charging station for charging batteries of an electric vehicle. The tank flap or charging flap arrangement according to the invention can have in particular two connection parts, for example for connection to a filler neck for entry of diesel fuel into a fuel tank, on the one hand, and to a filler neck for entry of a urea solution (AdBlue) into a vehicle tank, on the other hand. It is also possible for the two connection parts to be provided for connection to two electrical connections. One of the connections can then be provided for connection to a rapid charging station of high electrical power and one of the connections can be provided for connection to a conventional electrical supply source of lower electrical power.

In addition to the first pivot axis of the hinge arm, a second pivot axis, about which the flap can pivoted relative to the hinge arm, is provided according to the invention. The flap of the tank flap or charging flap arrangement according to the invention is firstly pivotable between a closed position and a first opening position. While the housing is closed in the closed position by the flap, for example is closed in a sealed manner by means of suitable seals, the access to the interior of the housing, in particular to the at least one connection part, is free in the first opening position of the flap. In said first opening position, refueling or electrical charging of the vehicle can therefore be carried out. Furthermore, the flap of the tank flap or charging flap arrangement according to the invention can be opened further in relation to the first opening position into a second opening position, preferably with the hinge arm already pivoted from the closed position into the first opening position. It is possible here for the flap to be held both in the first opening position and in the second opening position in a manner free of force. The first and second pivot axes can run in particular substantially parallel to each other. However, it is basically also possible for the first and second pivot axes to run at an angle to each other. The first pivot axis and the second pivot axis can be formed at opposite ends of the hinge arm. The first pivot axis and/or the second pivot axis can be formed by cylindrical axle components mounted on the housing or on the hinge arm.

The ergonomics can be improved by the flap of the tank flap or charging flap arrangement according to the invention being able to be pivoted further in relation to the first opening position by means of pivoting about the second pivot axis. In particular, more space is available for the refueling operation or the electrical charging operation by means of a user. Rectilinear charging flaps for electrical charging frequently remain in the open position for a long period of time. Since the flap in the second opening position protrudes in particular less far from the outer surface of the vehicle than in the first opening position, the flap constitutes a smaller obstacle even during a longer opening state. As a result, for example, an arrangement on the front side of the vehicle or on the vehicle rear is easily possible, for example integration in the radiator grille. A risk of damage or injury by the protruding flap is reduced by means of the second opening position according to the invention.

The opening angle of the flap from the closed position into the first opening position can be approximately 90°. The opening angle of the flap from the closed position into the second opening position can be more than 90°, preferably more than 120°, furthermore preferably approximately 180°. The opening angle is the angle about which the flap pivots open between the positions mentioned. In the second opening position, the plane spanned by the flap can lie substantially parallel and at a small distance from the plane spanned by the adjacent outer skin of the vehicle. The flap can lie substantially in alignment or flush with the adjacent outer skin in the second opening position. As a result, the obstacle caused by the flap in the second opening position is further minimized.

According to a further refinement, the flap can be mounted pivotably on the hinge arm via an adapter plate. The flap is then fastened to the adapter plate and the adapter plate is mounted on the hinge arm so as to be pivotable about the second pivot axis. An advantage of such an adapter plate carrying the flap is that the tank flap or charging flap arrangement can be delivered fully preassembled, but without the flap fitted. The flap can then be painted, for example, by a car manufacturer itself as customer and subsequently fitted to the adapter flap.

According to a further refinement, a slotted guide mechanism can be provided which controls the pivoting movement of the hinge arm and of the flap. The effect achieved by such a slotted guide mechanism can be an in particular mechanical forced guidance of the flap movement, in particular the pivoting movement of the flap between the first and second opening position. According to a refinement in this regard, the slotted guide mechanism can comprise at least one slotted guide lever which is mounted pivotably on the hinge arm and on which the flap or the adapter plate is guided, in particular forcibly guided (mechanically), during pivoting about the second pivot axis, i.e. pivoting between the first and second opening position. Said forced guidance reliably defines the pivoting movement of the flap or of the adapter plate. Undesirable movement tolerances which could lead, for example, to the flap striking against a body cutout, can thus be reliably avoided. For example, two slotted guide levers which are arranged pivotably on both sides of the hinge arm can be provided.

According to a further refinement in this regard, the at least one slotted guide lever can have at least one control groove in which at least one control projection of the flap or of the adapter plate is guided, in particular is forcibly guided, during pivoting about the second pivot axis. The control groove predetermines the movement of the flap or of the adapter plate between the first and second opening position.

During a movement of the flap between the closed position and the first opening position, the at least one slotted guide lever connects the flap or the adapter plate and the hinge arm fixedly to each other. Only a pivoting movement of the hinge arm and, with the latter, the flap or adapter plate about the first pivoting axis therefore takes place. During a movement of the flap between the first opening position and the second opening position, the at least one slotted guide lever pivots in relation to the hinge arm, and the flap movement is guided via the control projection of the flap or of the adapter plate being guided in the at least one control groove of the at least one slotted guide lever the pivoting movement of the flap.

According to a further refinement in this regard, the at least one slotted guide lever can comprise at least one blocking projection which, in the second opening position of the flap and until the first opening position of the flap is reached, lies against a blocking stop of the housing and thus blocks a pivoting of the hinge arm about the first pivot axis. It is thereby ensured that the flap first of all has to be pivoted back out of the second opening position into the first opening position before pivoting about the first pivot axis is possible. The blocking projection is released from blocking engagement with the blocking stop here preferably by the radial cam of the at least one slotted guide lever during the movement of the flap into the first opening position, and therefore the hinge arm can subsequently be pivoted together with the flap into the closed position.

According to a further refinement, a first spring can be provided which prestresses the hinge arm into the first opening position. The first spring can be a torsion spring which is held at one end, for example at a first end, on the housing and which is held at the other end, for example at a second end, on the hinge arm, and therefore the torsion spring is twisted in relation to its inoperative shape and is therefore prestressed when the hinge arm is pivoted from the first opening position of the flap into the closed position. In this refinement, the torsion spring is prestressed during the closing of the flap from the first opening position into the closed position, and therefore the torsion spring subsequently then seeks to move the flap from the closed position back into the first opening position. This is prevented in the closed position as a rule by a suitable releasable locking of the flap to the housing, as will be explained in more detail further below. The first spring can be composed of metal. The torsion spring can be, for example, a metal helical spring which, in the closed state of the flap, is twisted in relation to its inoperative position. If, for example, a locking device which holds the flap in the closed position is released, the torsion spring, because of its prestressing, can push the flap into the first opening position.

A reverse configuration would also be conceivable, however, in which the first spring prestresses the flap into its closed position. This could in turn involve, for example, a torsion spring which is held at one end on the housing and which is held at the other end on the hinge, and therefore the torsion spring is twisted in relation to its inoperative shape and is therefore prestressed when the hinge arm is pivoted from the closed position of the flap into the first opening position.

According to a further refinement, a first spring can be provided which prestresses the hinge arm below a limit opening angle of the flap into the closed position and which prestresses the hinge arm above the limit opening angle into the first opening position. The limit opening angle can be, for example, essentially half the opening angle between the closed position and the first opening position. In this refinement, the first spring can be a wire spring, the first end of which is held on the housing and the second end of which is held on the hinge arm, wherein the wire spring is compressed in relation to its inoperative shape and is therefore prestressed when the hinge arm is pivoted from the closed position of the flap into the limit opening position, and wherein the wire spring is stretched in relation to its inoperative shape and thus prestressed when the hinge arm is pivoted from the limit opening position of the flap into the first opening position. The wire spring can take up its inoperative shape at the limit opening angle.

Such springs are known per se. They have a dead center at the limit opening angle. Below said limit opening angle, they attempt, because of their prestressing, to push the hinge arm and therefore the flap into the closed position. Above the limit opening angle, they attempt, because of their prestressing, to push the hinge arm and therefore the flap into the first opening position. The wire spring can have, for example, a Z shape, wherein that limb of the Z shape which forms the first end is held on the housing, for example in a suitable receptacle, and that limb of the Z shape which forms the second end is held on the hinge arm, for example likewise in a suitable receptacle.

According to a further refinement, a second spring can be provided which prestresses the flap into the second opening position. The second spring can also be composed of metal. The second spring can be a torsion spring which is held at one end, for example at a first end, on the hinge arm and which is held at the other end, for example at a second end, on the flap or on an adapter plate holding the flap, and therefore the torsion spring is twisted in relation to its inoperative shape and is therefore prestressed when the flap is pivoted from the second opening position into the first opening position.

According to a further refinement, it can be provided that the second spring is a leaf spring, wherein a first end of the leaf spring is held on the flap or on an adapter plate holding the flap, wherein a second end of the leaf spring engages in a latching manner in a first recess of the hinge arm until the flap is opened from the first opening position further in the direction of the second opening position, wherein the second end of the leaf spring engages in a latching manner in a second recess of the hinge arm in the second opening position of the flap, and wherein, when the flap pivots from the second opening position into the first opening position, the second end of the leaf spring is guided along a curved guide surface between the second recess and the first recess of the hinge arm. The leaf spring can be, for example, a sheet metal spring. A first end of the for example rectangular leaf spring is held on the flap or on an adapter flap, for example in a clamping manner. An opposite second end of the leaf spring is free and, during the pivoting of the flap relative to the hinge arm between the first and second opening positions, is moved between two recesses of the hinge arm, in which recesses the second end of the leaf spring engages in a latching manner in the first or second opening position. The latching engagement in the first opening position is maintained even during further movement of the flap into the closed position. By means of the latching engagement of the second end of the leaf spring into the respective recess, the flap is held in the first opening position and in the second opening position in each case in a manner free of force. On account of the engagement in the first opening position, the flap does not pivot relative to the hinge arm even during a movement of the hinge arm between the first opening position and the closed position. On the contrary, the leaf spring has to be released from the respective engagement both in the first opening position and in the second opening position of the flap by means of, for example, manual exertion of force on the flap. Between the recesses, i.e. during the pivoting movement of the flap between the first and the second opening position, the second end of the leaf spring slides along a curved guide surface of the hinge arm. By means of the friction produced in the process, it is ensured that the flap is not guided between the first and second opening position in a manner free of force. On the contrary, high-quality operating haptics arise by means of the contact between the second end of the leaf spring and the guide surface. The holding of the flap in the first opening position and the second opening position is achieved in a particularly simple manner by means of the leaf spring. In addition, it is possible, by engagement of the second end of the leaf spring in the first or the second recess, to suitably adjust the required forces for releasing the leaf spring from the recesses, as would be explained in more detail below.

The second end of the leaf spring can have a folded end portion which engages in a latching manner in the first or second recess of the hinge arm. The folded end portion can be, for example, V-shaped. It can, for example, engage behind the recesses of the hinge arm.

According to a further refinement, the engagement of the second end of the leaf spring in the first recess of the hinge arm can be lower than the engagement in the second recess of the hinge arm. As already discussed, by means of suitable configuration of the engagements, the required force for releasing the second end of the leaf spring from the respective engagement, and therefore the required force for pivoting the flap from the first opening position into the second opening position, and vice versa, can be adjusted in a targeted manner. By the engagement in the first opening position being lower than in the second opening position, the force required for releasing the second end from the engagement is greater starting from the first opening position than starting from the second opening position.

The effect that can be achieved by a different adjustment of the force brought about in this manner or in some other way, in conjunction with the configuration and arrangement of the first spring, in particular the spring force thereof, is that, during opening of the flap from the closed position, the hinge arm first of all pivots about the first pivot axis relative to the housing and the flap is thus moved into the first opening position before, upon a further, higher exertion of force, the flap is pivoted about the second pivot axis relative to the hinge arm into the second opening position. The effect that can correspondingly be achieved in this manner is that during a closing of the flap from the second opening position, the flap first of all is pivoted about the second pivot axis relative to the hinge arm into the first opening position before the hinge arm is pivoted about the first pivot axis relative to the housing and the flap is therefore moved into the closed position. For this purpose, in the abovementioned example of a leaf spring as the second spring, the force required for releasing the first spring can adjusted to a value between the forces required for releasing the second end of the leaf spring from the first recess and from the second recess.

The tank flap or charging flap arrangement according to the invention can further comprise a locking device, in particular a push-push locking device, with which the flap or an adapter plate carrying the flap can be locked releasably to the housing in the closed position of the flap. Such a locking device is known from EP 2 364 258 B1 which has already been mentioned at the beginning. For the release, the flap is slightly overpressed inward from the closed position. A ram of the push-push locking device then moves out of a ram receptacle into an extended position and pushes the flap into a slightly open position, in which the flap can be grasped manually and pivoted open further into the first opening position. By means of a suitable configuration of first and second spring, it is also possible here for the push-push locking device to release the flap and for the flap then to automatically pivot open into the first and optionally also into the second opening position in a spring-driven manner.

The push-push locking device, for example a ram of the push-push locking device, can be arranged, for example, on the inner side of the free end of the flap or of the adapter plate and can engage in a ram receptacle arranged opposite on the housing of the arrangement.

According to a further refinement, the first pivot axis and/or the second pivot axis can run substantially horizontally in the state of the tank flap or charging flap arrangement in which the latter is mounted on a vehicle. The pivot axes can thereby be arranged in such a manner that the flap pivots open upward in the state mounted on the vehicle. As a result, firstly, the connection parts for refueling or electrical charging and a locking device are not all located next to one another. On the contrary, the locking device can be arranged in the region of the free end of the flap and therefore below the connection parts in the mounted state of the arrangement. The overall size of the tank flap or charging flap arrangement in the lateral direction (x direction) is thereby reduced. A reduction by up to 20% in relation to known flaps is thereby possible.

In addition, the flap in the first opening position can thus serve as a protective roof for the housing interior and can thus protect the housing interior against weather influences, such as snow or rain. This is particularly advantageous in the case of electrical charging flaps which stand open for a long time. Furthermore, it is thereby possible to install the tank flap or charging flap arrangement on both sides of a vehicle without a structural change. It is correspondingly possible to install the same tank flap or charging flap arrangement on each side of the vehicle, for example in the case of Plug-in-Hybrid vehicles (PHEV) which have both a tank flap arrangement and a charging flap arrangement. In addition, there are greater freedoms in this manner in the design of the flap. A closer arrangement to the B pillar, a vehicle door or the (rear) lights of a car is possible. Possible images on the inside of the flap can also be better read.

The invention also relates to a vehicle, in particular a car, with at least one tank flap or charging flap arrangement according to the invention mounted thereon.

BRIEF DESCRIPTION OF THE DRAWINGS

Exemplary embodiments of the invention are explained in more detail below with reference to figures, in which, schematically.

Unless stated otherwise, the same reference signs denote identical objects in the figures.

DETAILED DESCRIPTION

The tank flap or charging flap arrangement shown in the figures can serve for the refueling or electrical charging of a vehicle, such as a car. For this purpose, the tank flap or charging flap arrangement can be inserted into a mounting opening in the vehicle. The tank flap or charging flap arrangement according to the invention is described below using the example of a tank flap arrangement. However, it goes without saying that the arrangement shown in the figures can also involve a charging flap arrangement.

The first exemplary embodiment of a tank flap arrangement shown in FIGS. 1 to 10 has a housing 10 which can be composed, for example, of a plastic and can be inserted in a manner known per se into a mounting opening in a vehicle. For this purpose, a plurality of latching projections 12 are formed on the outer side of the housing and, in the mounted state, latch on the mounting opening. In the example shown, two connection parts 14 are arranged in the base of the housing 10, in the present case for connecting two filler necks for filling with an operating substance of the vehicle. For example, one of the filler necks can be provided for filling a vehicle tank with a diesel fuel and the other of the filler necks can be provided for filling a vehicle tank with a urea solution (AdBlue).

Figure 1:
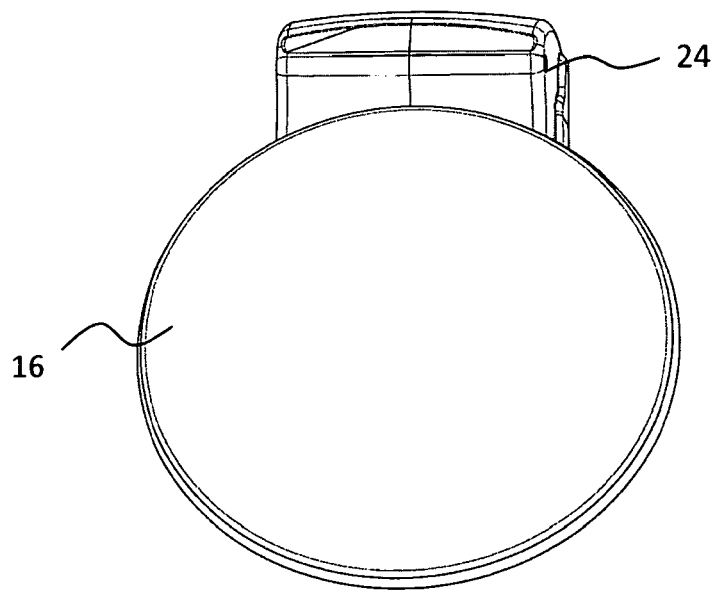
FIG. 1 shows a first exemplary embodiment of a tank flap or charging flap arrangement according to the invention, with the flap in the closed position, in a first perspective view.
Figure 2:
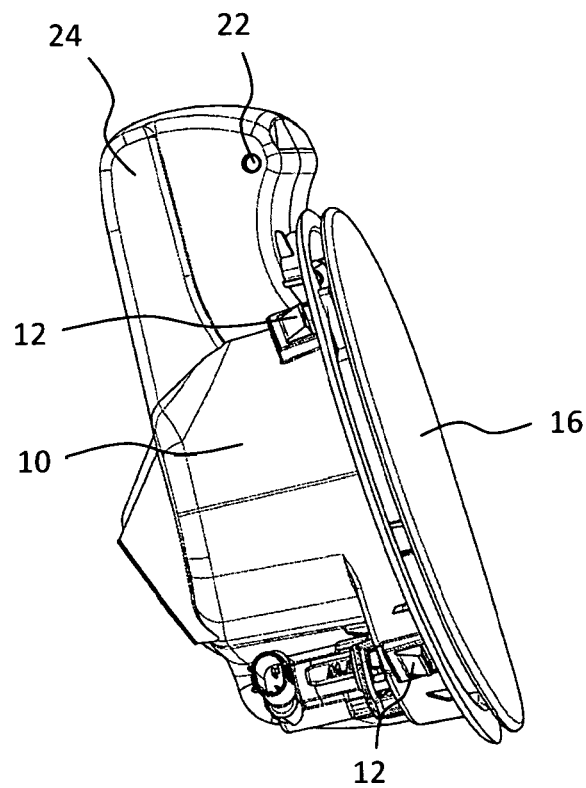
FIG. 2 shows the illustration from FIG. 1 in a second perspective view.
Figure 3:
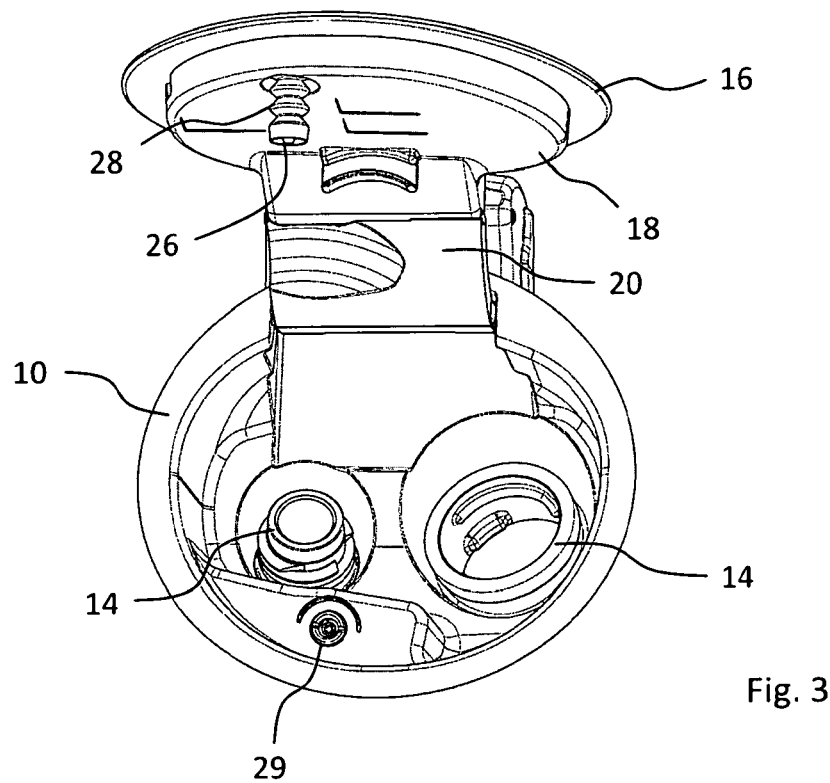
FIG. 3 shows the tank flap or charging flap arrangement from FIG. 1, with the flap in the first opening position, in a first perspective view.
Figure 4:
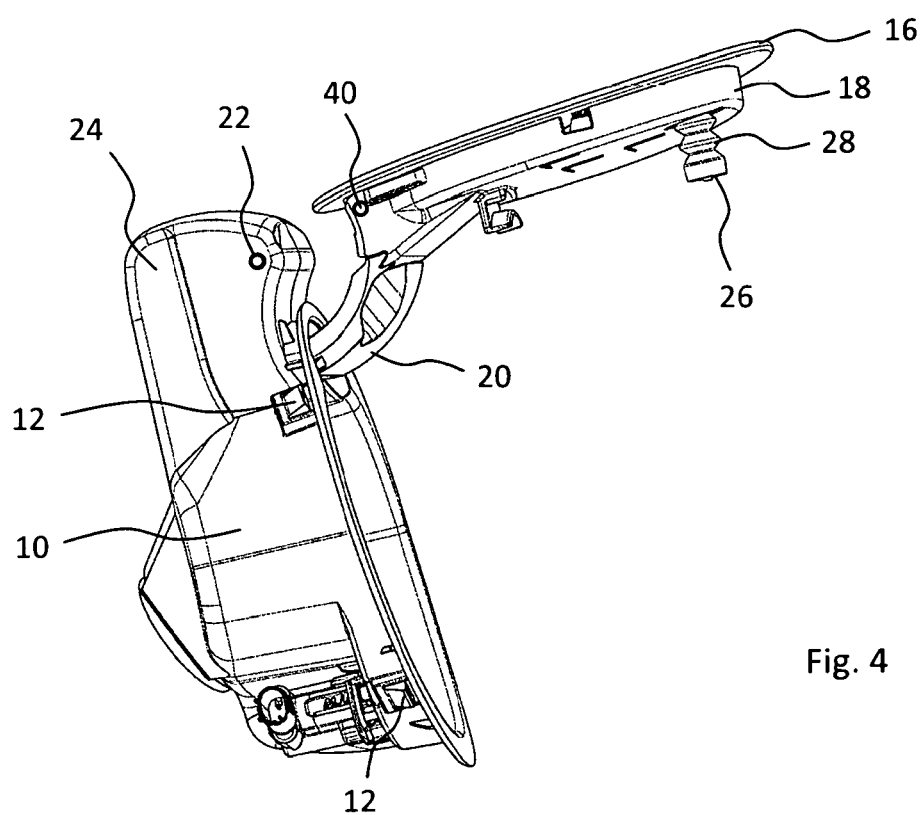
FIG. 4 shows the illustration from FIG. 3 in a second perspective view.

Reference sign 16 shows a flap which is substantially round in the example shown and which, in the closed position shown in FIGS. 1 and 2, closes the access to the housing interior. As can be seen in particular in FIGS. 3 to 6, the flap 16 is held on an adapter plate 18. The adapter plate 18 is held in turn on a curved hinge arm 20 which is mounted on the housing 10 so as to be pivotable via a first pivot axis 22 between the closed position, which is shown in FIGS. 1 and 2, of the flap 16 and the first opening position, which is shown in FIGS. 3 and 4, of the flap 16. In the example shown, the first pivot axis 22 is formed by a cylindrical axle component. In the closed position of the flap 16, the hinge arm 20 is accommodated in an extension 24 of the housing 10, and the flap 16 can end flush with the surrounding outer skin of the vehicle. Over the course of the pivoting about the first pivot axis 22, the hinge arm 20 emerges from the housing 10, as can be seen in particular in FIGS. 3 to 6.

In the region of the free end of the adapter plate 18, a ram 26 of a push-push locking device is arranged on said adapter plate. The ram is held in a rubber or plastics bellows 28. Formed in the housing 10 is a corresponding ram receptacle 29 of the push-push locking device, into which ram receptacle the ram 28 enters during the closing of the flap, wherein a releasable locking of the flap 16 in the closed position shown in FIGS. 1 and 2 occurs. The push-push locking device can be designed, for example, as described in EP 2 364 258 B1. If the flap 16 is, for example, over pushed manually inward from the closed position shown in FIGS. 1 and 2, the ram 26 is pushed out of the ram receptacle 29, as a result of which the flap 16 is pushed into a slightly open position (not illustrated), from which the flap can be gripped from behind manually and can be pivoted open into the first opening position, which is shown in FIGS. 3 and 4.

Figure 9:
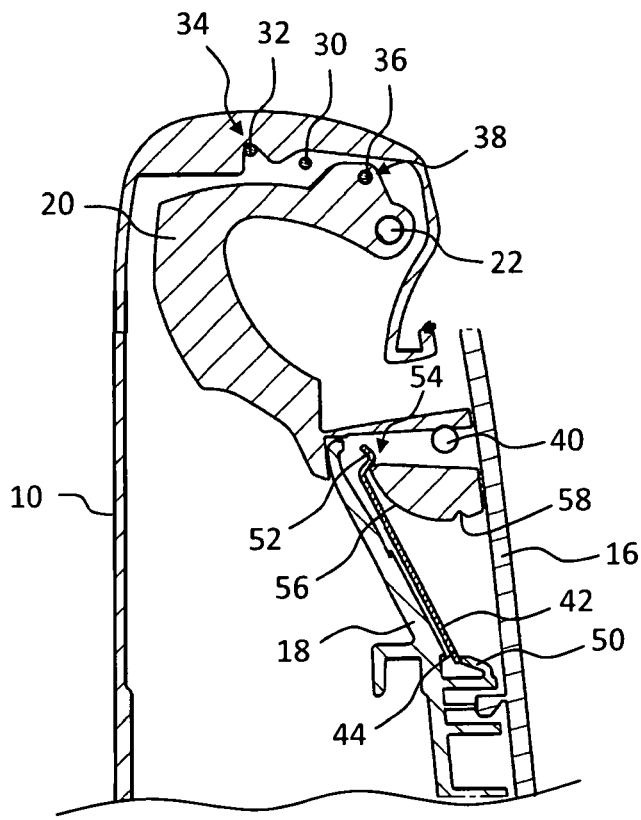
FIG. 9 shows part of a cross sectional view through the tank flap or charging flap arrangement from FIGS. 1 to 8 in the operating state shown in FIGS. 1 and 2.
Figure 10:
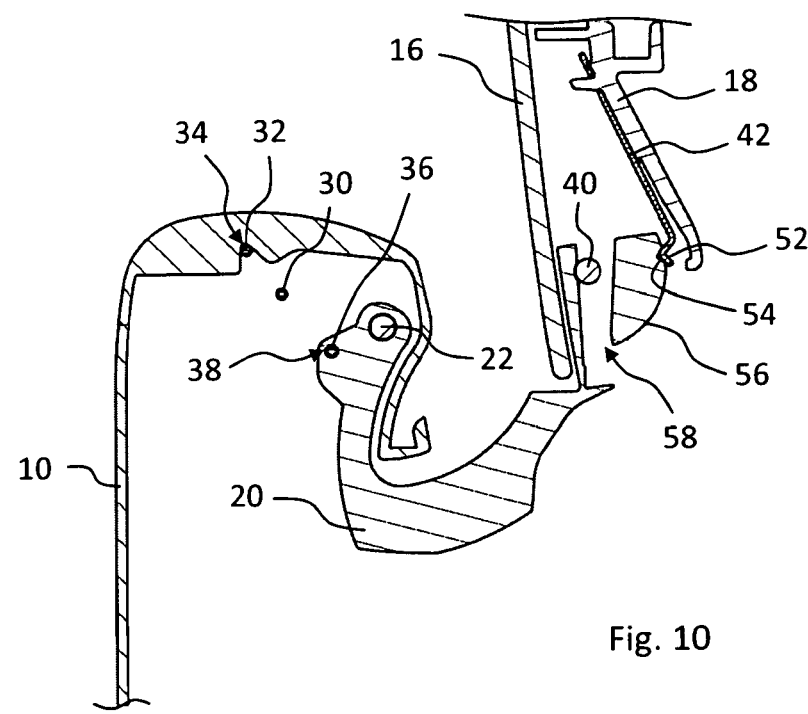
FIG. 10 shows part of a cross sectional view through the tank flap or charging flap arrangement from FIGS. 1 to 8 in the operating state shown in FIGS. 5 and 6.

A first spring 30, for example a Z-shaped wire spring 30, prestresses the hinge arm 20, and therefore the adapter plate 18 and the flap 16, below a limit opening angle of the flap 16 into the closed position and above the limit opening angle into the first opening position (see FIGS. 9 and 10). That leg of the wire spring 30 which forms a first end 32 is held in a recess 34 of the housing 10. That leg of the wire spring 30 which forms a second end 36 is held in a bore 38 in the hinge arm 20. During pivoting of the hinge arm 20 from the closed position, shown in FIG. 9, of the flap 16 into the first opening position and there beyond, the wire spring 30 is deflected, in relation to its inoperative shape and therefore prestressed. In the example shown, the wire spring 30 is compressed in relation to its inoperative shape in order to reach the limit opening angle and, after exceeding the limit opening angle, is stretched in relation to its inoperative shape. At the limit opening angle, the wire spring 30 has a dead center. The configuration and function of such wire springs are known per se.

Figure 5:
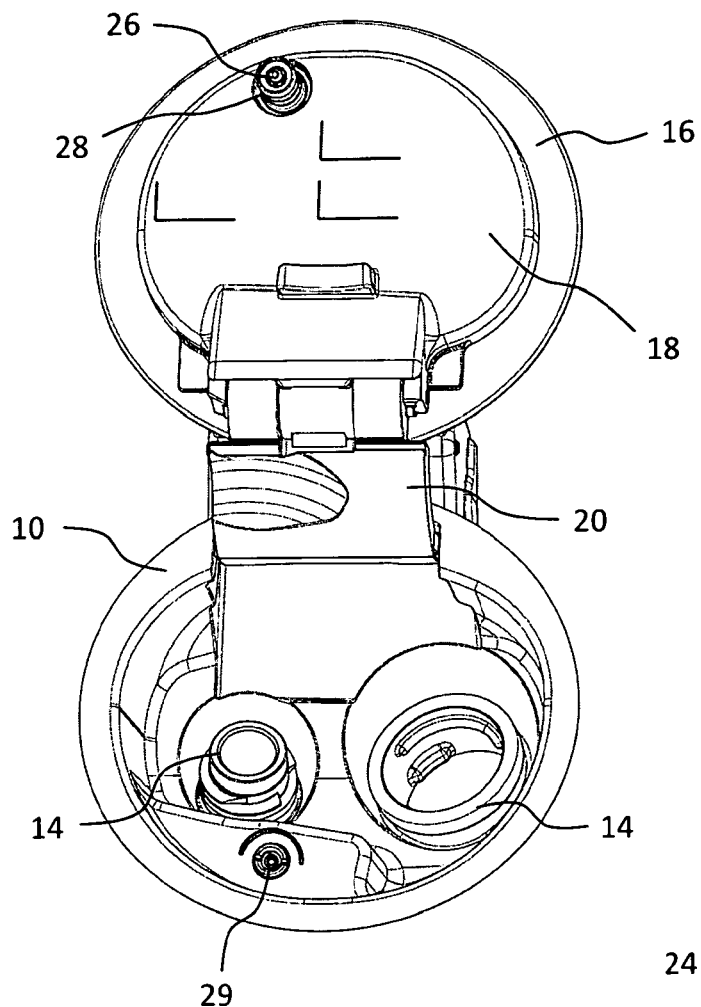
FIG. 5 shows the tank flap or charging flap arrangement from FIG. 1, with the flap in the second opening position, in a first perspective view.
Figure 6:
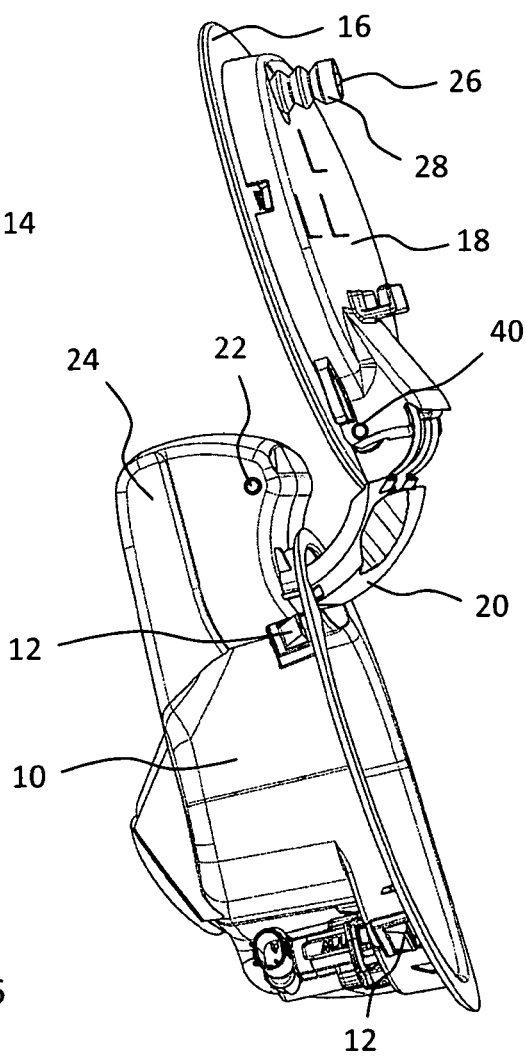
FIG. 6 shows the illustration from FIG. 5 in a second perspective view.

Furthermore, in the case of the tank flap or charging flap arrangement shown in FIGS. 1 to 10, the adapter plate 18 and, with the latter, the flap 16 is mounted on the hinge arm 20 so as to be pivotable about a second pivot axis 40. In the example shown, the second pivot axis 40 is also formed by a cylindrical axle component. The first pivot axis 22 and the second pivot axis 40 run parallel to each other and are formed at opposite ends of the hinge arm 20. It is thereby possible to further pivot open the adapter plate 18, and therefore the flap 16, from the first opening position, which is shown in FIGS. 3 and 4, into the second opening position, which is shown in FIGS. 5 and 6, by relative pivoting about the second pivot axis 40 in relation to the hinge arm 20. In the example shown, the opening angle of the flap 16 from the closed position shown in FIGS. 1 and 2 into the first opening position shown in FIGS. 3 and 4 is approximately 90°. In the example shown, the opening angle of the flap 16 from the closed positioned shown in FIGS. 1 and 2 into the second opening position shown in FIGS. 5 and 6 is approximately 180°. In the second opening position, the flap 16 can be substantially parallel and tightly adjacent to the outer skin of the vehicle. As a result, the flap 16 constitutes a minimal obstacle. At the same time, the flap 16 can remain in the first opening position shown in FIGS. 3 and 4 and can provide, for example, protection against weather influences. In this connection, it is furthermore advantageous if the flap 16 pivots open upward in the state mounted on the vehicle, wherein the pivot axes 22, 40 then run substantially horizontally.

Figure 7:
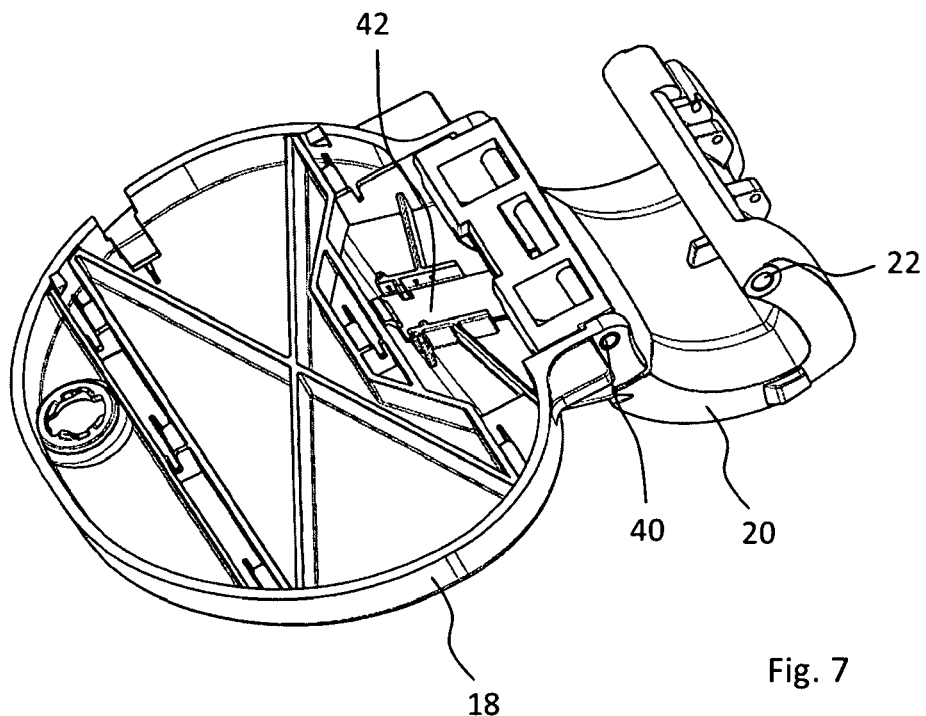
FIG. 7 shows part of the tank flap or charging flap arrangement from FIGS. 1 to 6 in a perspective view.
Figure 8:
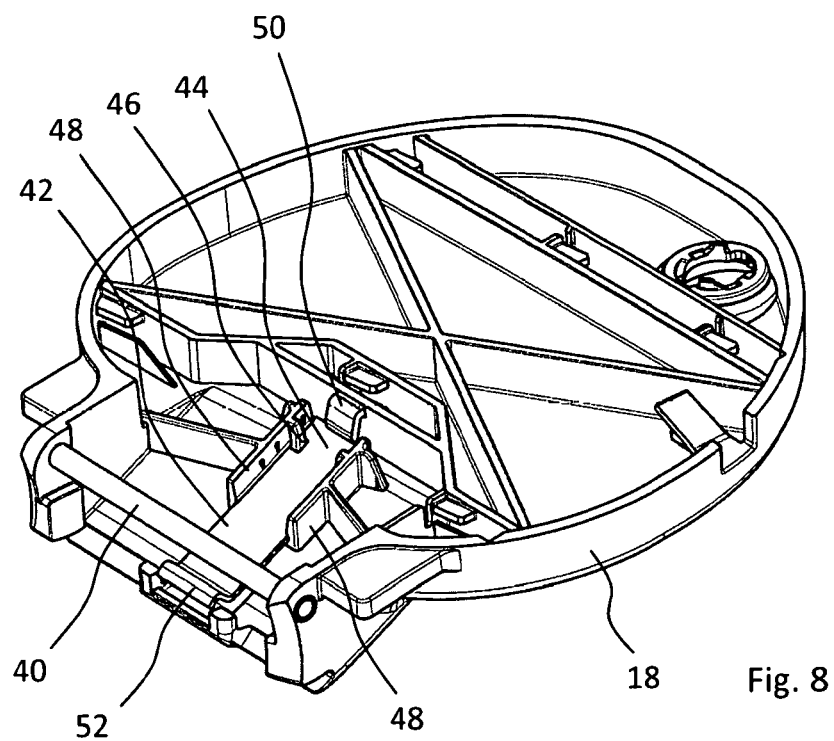
FIG. 8 shows a further part of the tank or charging flap arrangement from FIGS. 1 to 6 in a perspective view.

The second spring acting between the hinge arm 20 and the adapter plate 18 during the movement of the adapter plate 18 and the flap 16 relative to the hinge arm 20 will be explained in more detail below with reference to FIGS. 7 to 10. For illustrative reasons, FIG. 7 illustrates the adapter plate 18 without the flap 16 and in the state held on the hinge arm 20. Again for illustrative reasons, the hinge arm 20 is also blanked out in FIG. 8. FIGS. 7 and 8 show, at the reference sign 42, a substantially rectangular leaf spring as the second spring 42 which, like the first spring 30, can be composed of a metal material. A first end 44 of the leaf spring 42 is held in a clamping manner on the adapter plate 18, as can be seen in particular in FIG. 8. Projections 46 from wall portions 48 of the adapter plate 18, the wall portions holding the leaf spring 42 laterally, engage in corresponding recesses of the leaf spring 42. As a result, the leaf spring 42 is initially fixed in the longitudinal direction. Furthermore, the first end 44 of the leaf spring 42 engages in a latching manner under an elastic latching arm 50 of the adapter plate 18, and therefore the first end 44 is also positionally fixed in the direction of the surface normal.

The second end 52 of the leaf spring 42 has a folded end portion 52 which, in the example illustrated, is folded in a V-shaped manner. During operation, said end portion 52 interacts with a first and second recess of the hinge arm and a curved guide surface provided between the first and second recess, as will be explained with reference to the partial cross sectional illustrations of FIGS. 9 and 10. In the view of FIG. 9 showing the closed position of the flap 16, the folded end portion 52 engages in a first recess 54 of the hinge arm. Specifically, the folded end portion 52 engages behind a wall of the hinge arm 20. The leaf spring 42 remains in this position for as long as the flap 16 is in the closed position, the first opening position or in between. In order to move the adapter plate 18 and therefore the flap 16 from the first opening position into the second opening position, i.e. in order to pivot the adapter plate 18 about the second pivot axis 40, first of all, by appropriate, for example manual, exertion of force, the folded end portion 52 has to be released from engagement with the first recess 54 of the hinge arm 20 by elastic deformation of the leaf spring 42. Subsequently, the folded end portion 52 slides, with the production of friction, along a curved guide surface 56 of the hinge arm 20 until, on reaching the second opening position, the folded end portion 52 engages in a second recess 58 of the hinge arm 20, as can be seen in FIG. 10. The folded end portion 52 also has to be released from the second recess 58 by appropriate, for example, manual exertion of force by elastic deformation of the leaf spring 42 in order to move the flap 16 back from the second opening position into the first opening position.

By means of the engagement of the end portion 52 in the first or second recess 54 or 58, it is firstly ensured that the flap 16 remains both in the first opening position and in the second opening position in a manner free from force. Secondly, the engagement of the end portion 52 in the first recess 54 is lower than in the second recess 58. As a result, the required force for releasing the leaf spring 42 from the first recess 54 is greater than the required force for releasing the end portion 52 from the second recess 58. The force which is required on the other hand in order to pivot the hinge arm 20 counter to the wire spring 30 lies between the forces required for releasing the folded end portion 52 from the first recess 54 and from the second recess 58.

It is thereby ensured that, during opening of the flap 16 from the closed position, the hinge arm 20 is first of all pivoted about the first pivot axis 22 in relation to the housing 10 until the flap 16 takes up the first opening position. Only subsequently, by further (increased) exertion of force, is the leaf spring 42 released from the first recess 54 and the flap 16 pivoted from the first opening position into the second opening position by relative pivoting in relation to the hinge arm 20 about the second pivot axis 40. By contrast, during closing of the flap from the second opening position, it is ensured by means of the described ratio of forces that first of all the flap 16 with the adapter plate 18 is pivoted relative to the hinge arm 20 about the second pivot axis 40 from the second opening position into the first opening position, and only subsequently is the flap 16 with the adapter plate 18 pivoted from the first opening position into the closed position by pivoting of the hinge arm 20 about the first pivot axis 22 in relation to the housing 10.

A second exemplary embodiment of a tank flap or charging flap arrangement according to the invention will be explained with reference to FIGS. 11 and 12, wherein, again for reasons of simplicity, reference is only made below to a tank flap arrangement. Again, an electrical charging flap arrangement could likewise be involved.

Figure 11:
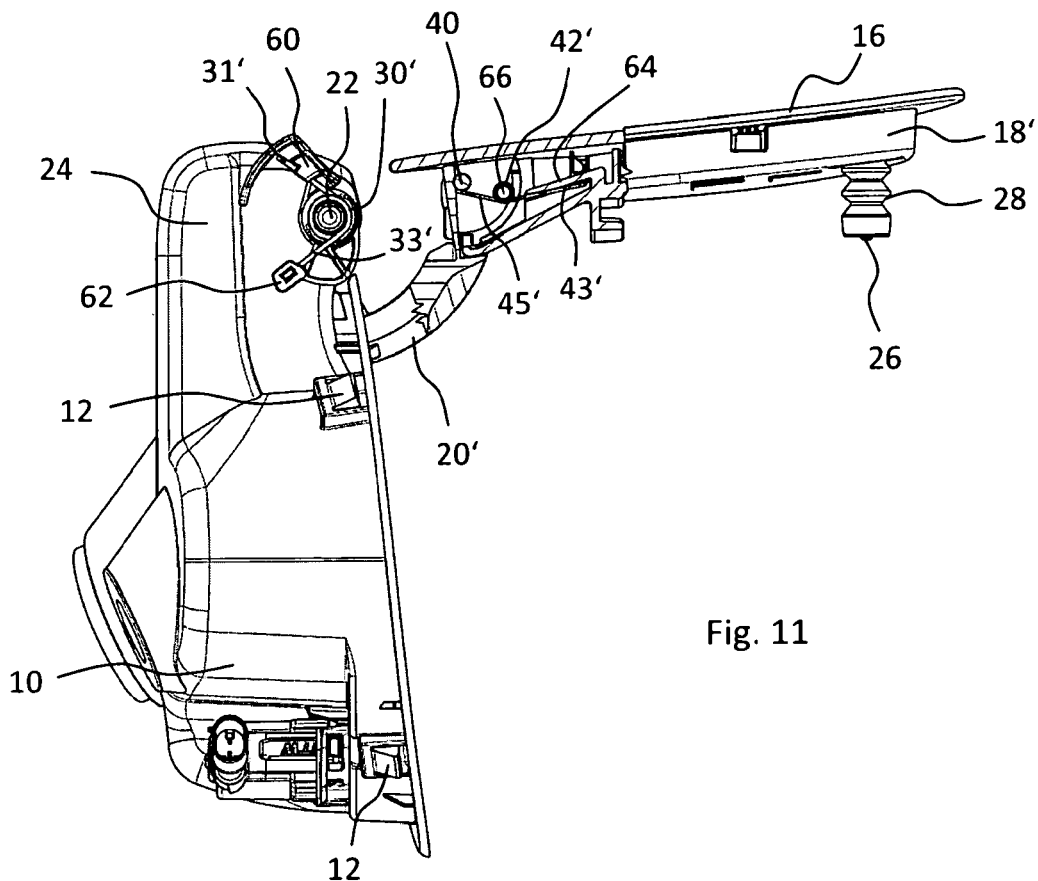
FIG. 11 shows a second exemplary embodiment of a tank flap or charging flap arrangement according to the invention in a partially sectioned illustration corresponding to the illustration from FIG. 4.
Figure 12:
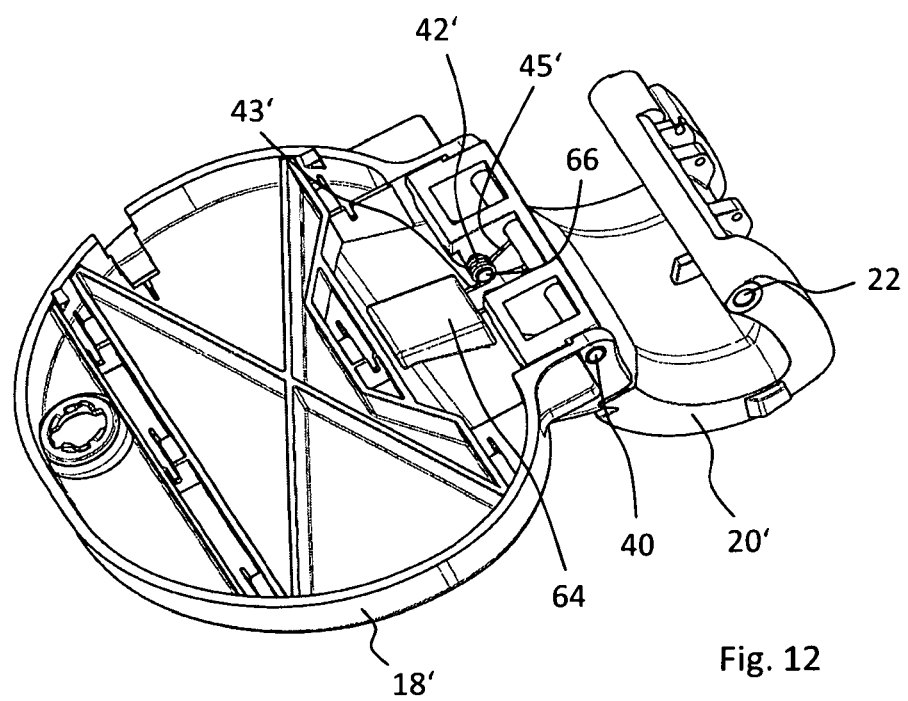
FIG. 12 shows the tank flap or charging flap arrangement from FIG. 11 in an illustration corresponding to the illustration from FIG. 7.

The tank flap arrangement according to the second exemplary embodiment shown in FIGS. 11 and 12 is substantially identical to the tank flap arrangement shown in FIGS. 1 to 10. It differs merely in respect of the configuration and arrangement of the first and second spring and the function brought about by this means during the opening and closing of the flap 16.

In the first opening position, illustrated in FIG. 11, of the flap 16, a first spring in the form of a torsion spring 30' is shown at the reference sign 30'. In the present case, the torsion spring 30' is wound spirally around the first pivot axis 22, wherein a first end 31' of the torsion spring 30' is held in a receptacle 60 of the housing 10. A second end 33' of the torsion spring 30' is held in a receptacle 62 of the hinge arm 20'. In the closed position of the flap 16, the torsion spring 30' is twisted in relation to its inoperative shape and is therefore prestressed, and therefore the torsion spring 30' subsequently seeks to pivot the flap 16, by pivoting of the hinge arm 20' about the first pivot axis 22, into the first opening position, which is shown in FIG. 11. This is prevented in the closed position because of the releasable locking of the adapter plate 18' to the housing 10, said releasable locking being ensured by means of the push-push locking device 26, 28, 29.

In addition, in FIGS. 11 and 12, a torsion spring 42' forming a second spring can be seen at reference number 42'. In the example illustrated, the torsion spring 42' is a double torsion spring 42' or a torsion spring 42' with a double coil. The double torsion spring 42' has an elongate portion 43' which is bent in a U-shaped manner and is held in a receptacle 64 of the adapter plate 18'. The two limbs of the U-shaped portion 43' each merge into a portion coiled spirally about one cylindrical projection 66 each of the hinge arm 20'. Only one of the projections 66 can be seen in FIG. 12. The other projection 66 is arranged opposite the projection 66 shown. An end portion 45' emerges from each spirally coiled portion of the torsion spring 42' and lies in each case against the second pivot axis 40, as can be seen in particular in FIG. 12.

In the first opening position, shown in FIG. 11, of the flap 16, the double torsion spring 42' is twisted in relation to its inoperative position, and therefore it pivots open the flap 16 from the first opening position into the second opening position, which can in turn have an opening angle of approximately 180°, in a manner free of force by pivoting the adapter plate 18' relative to the pivot arm 20' about the second pivot axis 40. If the flap 16 is pushed, for example manually, from the second opening position into the closed position, both the double torsion spring 42' and the torsion spring 30' twist in the process, wherein the flap 16 is held in the closed position, as explained, by means of the push-push locking device 26, 28, 29. Upon release of the flap 16 by the push-push locking device 26, 28, 29 the flap 16 is automatically pivoted open into the second opening position by the prestresses of the torsion spring 30' and of the double torsion spring 42'.

In the second exemplary embodiment, the state, shown in FIG. 11, of the first opening position is therefore only an intermediate state which the flap 16 takes up over the course of its opening operation from the closed position into the second opening position or over the course of its closing operation from the second opening position into the closed position. Owing to the configuration of the first and second spring in the second exemplary embodiment, the flap 16, in contrast to the first exemplary embodiment, cannot be held in the first opening position in a manner free of force.

Figure 13:
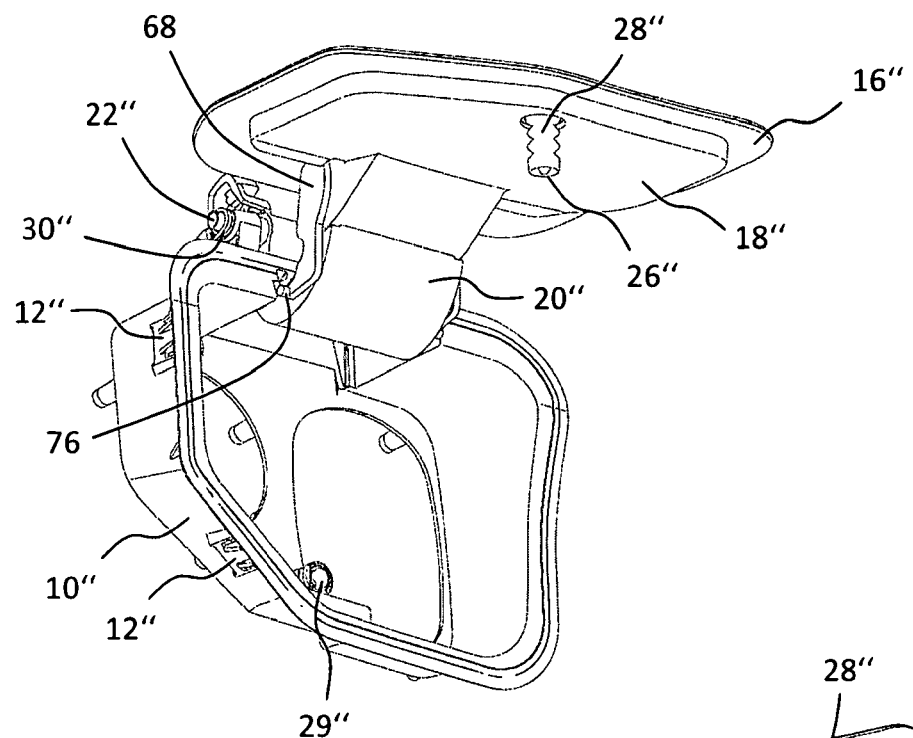
FIG. 13 shows a third exemplary embodiment of a tank flap or charging flap arrangement according to the invention in a perspective view.
Figure 14:
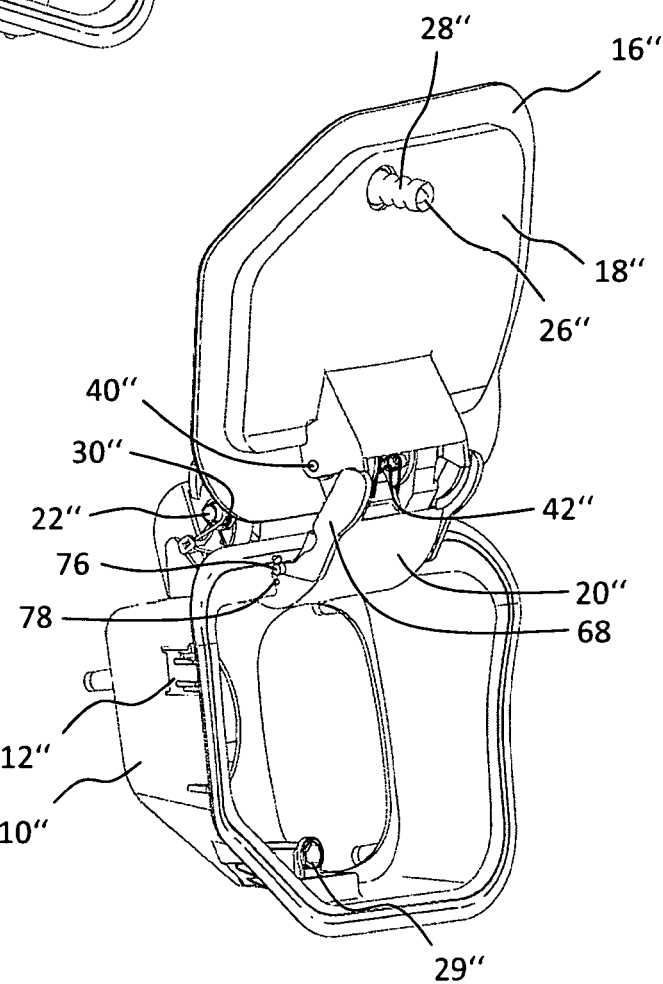
FIG. 14 shows the tank flap or charging flap arrangement, shown in FIG. 13, in a further operating state in a perspective view.
Figure 15:
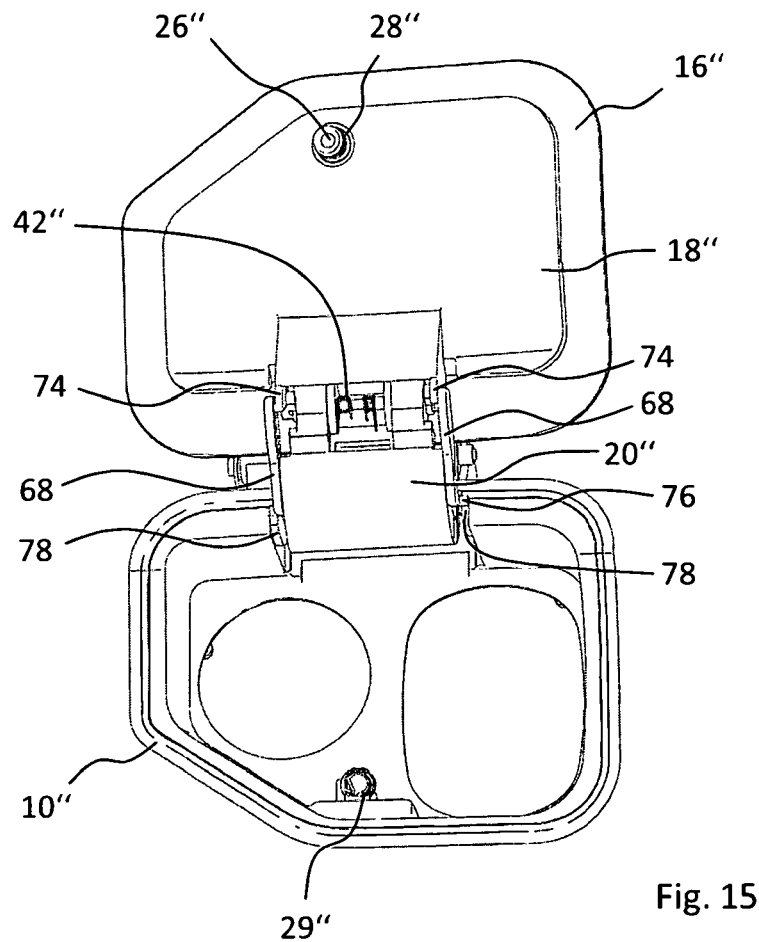
FIG. 15 shows a further view of the tank flap or charging flap arrangement shown in FIG. 14.

FIGS. 13 to 15 show a further tank flap or charging flap arrangement according to the invention. The latter corresponds very substantially in its basic design to the tank flap or charging flap arrangements shown in FIGS. 1 to 12. This tank flap or charging flap arrangement thus also has a housing 10" on which a hinge arm 20", which carries a flap 16" via an adapter plate 18", is mounted so as to be pivotable about a first pivot axis 22" between a closed position closing the housing 10 and a first opening position which is shown in FIG. 13. A torsion spring 30" is again wound spirally around the first pivot axis 22", wherein a first end of the torsion spring 30" is again held on the housing 10. A second end of the torsion spring 30" is again held in a receptacle of the hinge arm 20", as explained above with regard to the tank flap or charging flap arrangement shown in FIG. 11. In the closed position of the flap 16", the torsion spring 30" is twisted in relation to its inoperative shape and is therefore pretensioned, and therefore the torsion spring 30" subsequently seeks to pivot open the flap 16" into the first opening position, which is shown in FIG. 13, by pivoting of the hinge arm 20" about the first pivot axis 22". This is again prevented in the closed position by means of the push-push locking device 26", 28", 29" which, in the closed position, releasable locks the adapter plate 18" and therefore the flap 16" to the housing 10" in the manner explained above. After release of the push-push locking device 26", 28", 29", as explained above, the adapter plate 18", and therefore the flap 16", pivots into the first opening position, which is shown in FIG. 13, in a manner driven by the torsion spring 30".

Figure 16:
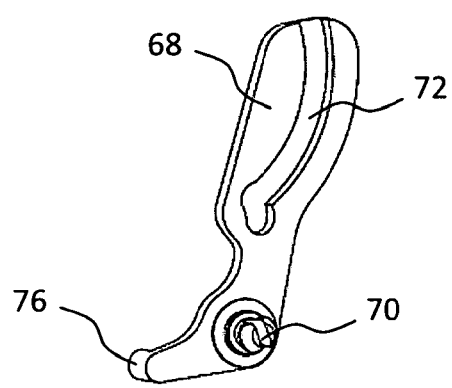
FIG. 16 shows a slotted guide lever of the tank flap or charging flap arrangement, shown in FIGS. 13 to 15, in a perspective view.

Furthermore, the adapter plate 18" is mounted on the hinge arm 20" so as to be pivotable via a second pivot axis 40". In addition, slotted guide levers 68 are mounted pivotably on the hinge arm 20" on both sides. The slotted guide levers 68 each have a bearing projection 70, shown in FIG. 16, with which bearing projections the slotted guide levers are each mounted pivotably in a corresponding bearing receptacle of the hinge arm 20". In addition, it can be seen in FIG. 16 that the two slotted guide levers 68, which are formed identically, but in a mirror-inverted manner, each have a control groove 72 on their inner side which faces the hinge arm 20" in the mounted state. A control projection 74 of the adapter plate 18" is guided in each of the control grooves 72. In addition, the slotted guide levers 68 each have a blocking projection 76 at their end facing away from the opening of the control groove 72. The control projections 74 and the blocking projections 76 can each be of pin-shaped, in particular cylinder-pin-shaped, design. It can be seen in FIGS. 14 and 15 that, in the second opening position, shown in FIGS. 14 and 15, of the flap 16", the blocking projections 76 lie against corresponding blocking stops 78 of the housing 10". This contact exists until the flap 16" and, with the latter, the adapter plate 18" are again in their first opening position shown in FIG. 13.

The slotted guide mechanism provided by the slotted guide levers 60 is such that the slotted guide levers 68 connect the adapter plate 18" and the hinge arm 20" fixedly to each other during a movement of the flap 16" between the closed position and the first opening position. Pivoting about the second pivot axis 40" is therefore not possible. Only after the first opening position is reached do the slotted guide levers 68 execute a pivoting movement about their pivot axis, which is defined by the bearing projection 70, relative to the pivot arm 20", the pivoting movement releasing the adapter plate 20" and the hinge arm 20" from each other. The adapter plate 18" and, with the latter, the flap 16" can now be pivoted open further about the second pivot axis 40 into the second opening position, wherein the pivoting movement takes place in a manner corresponding to the forced guidance predetermined by the control groove 72. In the process, the blocking projections 76 enters into contact with the blocking stop 78 of the housing 10". The closing movement of the flap 16" correspondingly takes place with a reverse sequence of the explained kinematics, wherein the contact of the blocking projections 76 against the blocking stops 78 of the housing 10 prevents pivoting of the flap 16" about the second pivot axis 40" until the first opening position is reached.

It should also be explained that, also in the case of the exemplary embodiment shown in FIGS. 13 to 16, a double torsion spring 42" is provided which corresponds in respect of arrangement, configuration and function to the double torsion spring 42' explained with respect to FIGS. 11 and 12. In this respect, reference should be made to the explanations with regard to FIGS. 11 and 12 in order to avoid unnecessary repetitions. Also in the case of the tank flap or charging flap arrangement according to FIGS. 13 to 16, after the release of the push-push locking device the flap 16" opens, i.e. automatically, into the fully open second opening position, as shown in FIGS. 14 and 15.

LIST OF REFERENCE SIGNS 10, 10" Housing
12, 12" Latching projection
14 Connection part
16, 16" Flap
18, 18" Adapter plate
20, 20" Hinge arm
22, 22" First pivot axis
24 Extension
26, 26" Ram
28, 28" Rubber or plastics bellows
29, 29'" Ram receptacle
30 Wire spring
30', 30" Torsion spring
31' First end of the torsion spring
32 First end of the wire spring
33' Second end of the torsion spring
34 Recess
36 Second end of the wire spring
38 Bore
40, 40" Second pivot axis
42 Leaf spring
42', 42" Double torsion spring
43' U-shaped portion of the torsion spring
44 First end of the leaf spring
45' End portions of the torsion spring
46 Projections
48 Wall portions
50 Elastic latching arm
52 Second end of the leaf spring/end portion
54 First recess
56 Guide surface
58 Second recess
60 Receptacle of the housing
62 Receptacle of the hinge arm
64 Receptacle of the adapter plate
66 Cylindrical projections of the hinge arm
68 Slotted guide lever
70 Bearing projection
72 Control groove
74 Control projection
76 Blocking projection
78 Blocking stop

The invention claimed is:

1. A tank flap or charging flap arrangement for a vehicle, comprising a housing (10, 10") which can be inserted into a mounting opening in the vehicle and has at least one connection part (14) for the refueling or electrical charging of the vehicle, furthermore comprising a flap (16, 16") which is arranged on a hinge arm (20, 20', 20") of the tank flap or charging flap arrangement, the hinge arm (20, 20', 20") being mounted on the housing (10, 10") so as to be pivotable about a first pivot axis (22, 22"),
wherein the flap (16, 16") is mounted on the hinge arm (20, 20', 20") so as to be pivotable about a second pivot axis (40, 40"), and therefore the flap (16, 16") can be pivoted between a closed position, in which the flap (16, 16") closes the housing (10, 10"), and a first opening position, in which the flap (16, 16") opens up access to the at least one connection part (14) for the refueling or electrical charging of the vehicle, and a second opening position which is opened further than the first opening position;
wherein the flap (16, 16"), while remaining in a first fixed orientation relative to the hinge arm (20, 20', 20"), is pivotable with the hinge arm (20, 20', 20") about the first pivot axis (22, 22") between the closed position and the first opening position, and wherein the flap (16, 16") is pivotable relative to the hinge arm about the second pivot axis (40, 40") into a second orientation relative to the hinge arm (20, 20', 20") in order to move between the first opening position and the second opening position.

2. The tank flap or the charging flap arrangement as claimed in claim 1, wherein an opening angle of the flap (16, 16") from the closed position into the second opening position is more than 90°.

3. The tank flap or charging flap arrangement as claimed in claim 1, wherein the flap (16, 16") is mounted pivotably on the hinge arm (20, 20', 20") via an adapter plate (18, 18', 18").

4. A tank flap or charging flap arrangement for a vehicle, comprising a housing (10, 10") which can be inserted into a mounting opening in the vehicle and has at least one connection part (14) for the refueling or electrical charging of the vehicle, furthermore comprising a flap (16, 16") which is arranged on a hinge arm (20, 20', 20") of the tank flap or charging flap arrangement, the hinge arm (20, 20', 20") being mounted on the housing (10, 10") so as to be pivotable about a first pivot axis (22, 22"), wherein the flap (16, 16") is mounted on the hinge arm (20, 20', 20") so as to be pivotable about a second pivot axis (40, 40"), and therefore the flap (16, 16") can be pivoted between a closed position, in which the flap (16, 16") closes the housing (10, 10"), and a first opening position, in which the flap (16, 16") opens up access to the at least one connection part (14) for the refueling or electrical charging of the vehicle, and a second opening position, which is opened further than the first opening position;

wherein a slotted guide mechanism is provided which controls the pivoting movement of the flap (16") relative to the hinge arm (20").

5. The tank flap or charging flap arrangement as claimed in claim 4, wherein the flap (16, 16") is mounted pivotably on the hinge arm (20, 20', 20") via an adapter plate (18, 18', 18") and the slotted guide mechanism comprises at least one slotted guide lever (68) which is mounted pivotably on the hinge arm (20") and on which the adapter plate (18") is guided during pivoting about the second pivot axis (40").

6. The tank flap or charging flap arrangement as claimed in claim 5, wherein the at least one slotted guide lever (68) has at least one control groove (72) in which at least one control projection (74) of the adapter plate (18") is guided during pivoting about the second pivot axis (40").

7. The tank flap or charging flap arrangement as claimed in claim 6, wherein the at least one slotted guide lever (68) comprises at least one blocking projection (76) which, in the second opening position of the flap (16") and until the first opening position of the flap (16") is reached, lies against a blocking stop (78) of the housing (10"), and thus blocks a pivoting of the hinge arm (20") about the first pivot axis (22").

8. The tank flap or charging flap arrangement as claimed in claim 1, wherein a first spring (30', 30") is provided which prestresses the hinge arm (20', 20") into the first opening position.

9. The tank flap or charging flap arrangement as claimed in claim 8, wherein the first spring (30', 30") is a torsion spring (30', 30") which is held at one end on the housing (10, 10") and which is held at the other end on the hinge arm (20', 20"), and therefore the torsion spring (30', 20") is twisted in relation to its inoperative shape when the hinge arm (20', 20") is pivoted from the first opening position of the flap (16, 16") into the closed position.

10. The tank flap or charging flap arrangement as claimed in claim 1, wherein a first spring (30) is provided which prestresses the hinge arm (20) below a limit opening angle of the flap (16) into the closed position, and which prestresses the hinge arm (20) above the limit opening angle into the first opening position.

11. The tank flap or charging flap arrangement as claimed in claim 10, wherein the first spring (30) is a wire spring (30), the first end (32) of which is held on the housing (10) and the second end (36) of which is held on the hinge arm (20), wherein the wire spring (30) is compressed in relation to its inoperative shape when the hinge arm (20) is pivoted from the closed position of the flap (16) into the limit opening position, and wherein the wire spring (30) is stretched in relation to its inoperative shape when the hinge arm (20) is pivoted from the limit opening position of the flap (16) into the first opening position.

12. The tank flap or charging flap arrangement as claimed in claim 1, wherein a second spring (42, 42', 42") is provided which prestresses the flap (16, 16") into the second opening position.

13. The tank flap or charging flap arrangement as claimed in claim 12, wherein the second spring (42', 42") is a torsion spring (42', 42") which is held at one end on the hinge arm (20', 20") and which is held at the other end on the flap (16, 16") or on an adapter plate (18', 18") holding the flap (16, 16"), and therefore the torsion spring (42', 42") is twisted in relation to its inoperative shape when the flap (16, 16") is pivoted from the second opening position into the first opening position.

14. The tank flap or charging flap arrangement as claimed in claim 12, wherein the second spring (42) is a leaf spring (42), wherein a first end (44) of the leaf spring (42) is held on an adapter plate (18) holding the flap (16), wherein a second end (52) of the leaf spring (42) engages in a latching manner in a first recess (54) of the hinge arm (20) until the flap (16) is opened from the first opening position further in the direction of the second opening position, wherein the second end (52) of the leaf spring (42) engages in a latching manner in a second recess (58) of the hinge arm (20) in the second opening position of the flap (16), and wherein, when the flap (16) pivots from the second opening position into the first opening position, the second end (52) of the leaf spring (42) is guided along a curved guide surface (56) between the second recess (58) and the first recess (54) of the hinge arm (20).

15. The tank flap or charging flap arrangement as claimed in claim 14, wherein the second end (52) of the leaf spring (42) has a folded end portion (52) which engages in a latching manner in the first and second recess (54, 58) of the hinge arm (20).

16. The tank flap or charging flap arrangement as claimed in claim 15, wherein a configuration of the engagement of the second end (52) of the leaf spring (42) in the first recess (54) of the hinge arm (20) and a configuration of the engagement of the second end (52) in the second recess (58) are such that a force required force for releasing the second end (52) from the first recess (54) is greater than a force required for releasing the second end (52) from the second recess (58).

17. The tank flap or charging flap arrangement as claimed in claim 16, wherein the first and second spring (30, 30', 30", 42, 42', 42") are designed and arranged in such a manner that, during an opening of the flap (16, 16") from the closed position, the hinge arm (20, 20', 20") first of all pivots about the first pivot axis (22, 22") into the first opening position and only subsequently does the flap (16, 16") pivot about the second pivot axis (40, 40") into the second opening position, and that, during a closing of the flap (16, 16") from the second opening position into the closed position, the flap (16, 16") first of all pivots about the second pivot axis (40, 40") into the first opening position and only subsequently does the hinge arm (20, 20', 20") pivot about the first pivot axis into the closed position.

18. The tank flap or charging flap arrangement as claimed in claim 1, furthermore comprising a locking device (26, 26", 28, 28", 29, 29"), in particular a push-push locking device (26, 26", 28, 28", 29, 29"), with which an adapter plate (18, 18', 18") carrying the flap (16, 16") can be locked releasably to the housing (10, 10") in the closed position of the flap (16, 16").

19. A tank flap or charging flap arrangement for a vehicle, comprising:
    a housing (10, 10") having has at least one connection part (14) for the refueling or electrical charging of a vehicle;
    a flap (16, 16") arranged on a hinge arm (20, 20', 20") of the tank flap or charging flap arrangement, the hinge arm (20, 20', 20") being mounted on the housing (10, 10") so as to be pivotable about a first pivot axis (22, 22");

wherein the flap (16, 16") is mounted on the hinge arm (20, 20', 20") so as to be pivotable about a second pivot axis (40, 40") that is in a fixed position on the hinge arm (20, 20', 20") and that moves with the hinge arm (20, 20', 20") such that the flap (16, 16") can be pivoted between a closed position, a first opening position and a second opening position;

wherein, in the closed position the flap (16, 16") closes the housing (10, 10");

wherein, in the first opening position, the flap (16, 16") opens up access to the at least one connection part (14) for the refueling or electrical charging of the vehicle; and wherein, in the second opening position, the flap (16, 16") is opened further than when in the first opening position;

wherein a first spring is provided which prestresses the hinge arm into the first opening position;

wherein a second spring is provided which prestresses the flap into the second opening position.

\* \* \* \* \*